United States Patent [19]
Michalon et al.

[11] Patent Number: 5,307,509
[45] Date of Patent: Apr. 26, 1994

[54] METHOD FOR THE TRANSMISSION OF DATA AMONG MOBILE BODIES OR AUTONOMOUS VEHICLES

[75] Inventors: Gilles Michalon, Courbevoie; Gérard Auger, Champagne sur Oise, both of France

[73] Assignee: Thomson-CSF, Puteaux, France

[21] Appl. No.: 791,161

[22] Filed: Nov. 13, 1991

[30] Foreign Application Priority Data

Nov. 14, 1990 [FR] France ............................ 90 14148

[51] Int. Cl.$^5$ ............................................ H04B 7/00
[52] U.S. Cl. .................................. 455/54.1; 455/58.2; 455/67.1; 370/85.3
[58] Field of Search ................ 370/85.2, 85.3, 95.1, 370/95.3, 94.1; 455/67.1, 69, 88, 34.1, 34.2, 54.1, 62, 63, 56.1, 58.2

[56] References Cited

U.S. PATENT DOCUMENTS

| | | | |
|---|---|---|---|
| 4,439,763 | 3/1984 | Limb | 370/85.2 |
| 4,514,843 | 4/1985 | Albanese | 370/85.2 |
| 4,630,264 | 12/1986 | Wah et al. | 370/85.3 |
| 4,672,657 | 6/1987 | Dershowitz . | |
| 4,685,105 | 8/1987 | Shikama et al. | 370/85.2 |
| 4,907,290 | 3/1990 | Crompton | 455/67.1 |
| 4,979,168 | 12/1990 | Courtois et al. | 370/85.3 |
| 5,068,654 | 11/1991 | Husher | 455/54.1 |

FOREIGN PATENT DOCUMENTS

0097309 1/1984 European Pat. Off. .
0270391 6/1988 European Pat. Off. .

OTHER PUBLICATIONS

ICC 1980 Conference Record, Seattle, Wash., Jun. 8–12, 1980, pp. 21.4.1–21.4.7, P. Spilling, et al., "Digital Voice Communications in the Packet Radio Network".

Primary Examiner—Reinhard J. Eisenzopf
Assistant Examiner—Nguyen Vo
Attorney, Agent, or Firm—Oblon, Spivak, McClelland, Maier & Neustadt

[57] ABSTRACT

A method which constructs, in each transmitter/receiver of a mobile body or vehicle, information tables recording the changes undergone by a radio channel by memorizing, during consecutive time intervals of a determined duration dT that are smaller than the period of recurrence T, of the statuses of the radio channel, namely "in collision", "busy" or "free". The method then sets fixed transmission instants in each transmitter/receiver, these fixed transmission instants being temporally spaced out at intervals equal to the recurrence period T, to predict the status of the channel for each fixed transmission instant as a function of the status of the channel memorized at the instant preceding it with a temporal shift equal to the period T, and in deciding to transmit at this instant if the predicted status of the channel is not a status of collision or to transmit at an instant deferred with respect to the predicted instant if the opposite is the case.

5 Claims, 4 Drawing Sheets

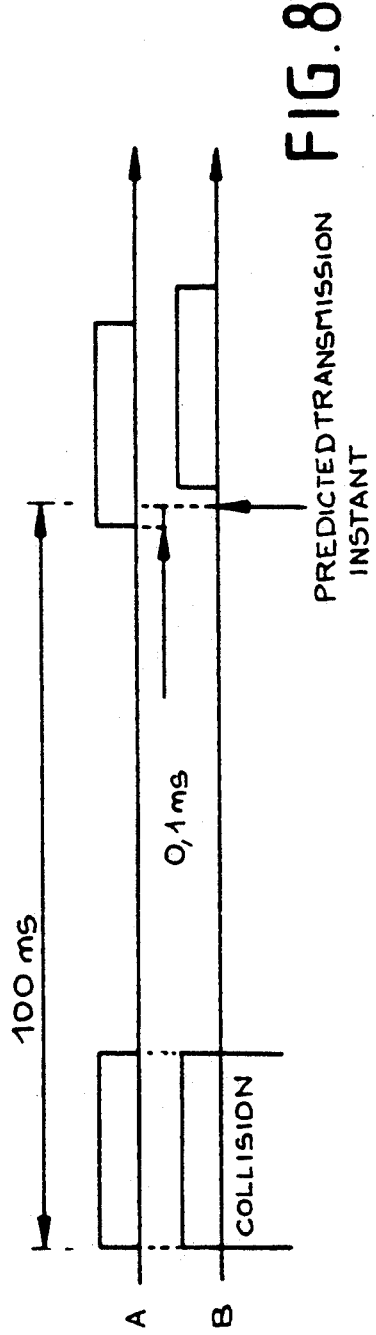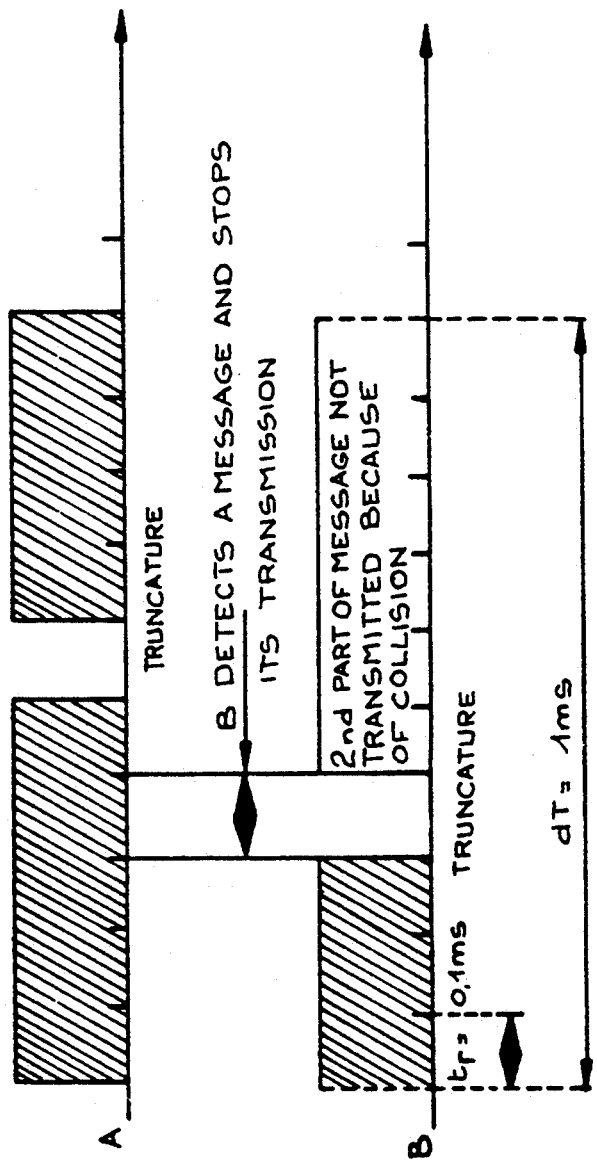

METHOD FOR THE TRANSMISSION OF DATA AMONG MOBILE BODIES OR AUTONOMOUS VEHICLES

BACKGROUND OF THE INVENTION

The present invention relates to a method for the transmission of data among mobile or autonomous vehicles having no absolute time reference and communicating with one another by radio link on a single channel with a limited range such that the propagation time remains negligible as compared with the reaction time $t_r$ of the receivers.

With a method such as this, if it is assumed that a vehicle is within effective range when the signal-to-noise ratio at reception remains at an appropriate level, then the only risk that a message will not be received arises out of the fact that it collides with another message transmitted at the same instant in a same perimeter by another vehicle.

The collisions take place notably when two vehicles B and C, within range of one and the same third vehicle A, transmit simultaneously towards this vehicle. There are then two possibilities depending on whether or not the two transmitting vehicles B and C are linked (i.e. are within radioelectrical range of each other) or are not linked and are concealed from each other by a third vehicle interposed between them.

In the former case, procedures known as CSMA or Carrier Sense Multiple Access procedures (i.e. listening for the freedom of the channel before transmission) enable the collisions to be greatly reduced.

However, in the latter case, there is no access procedure by which these collisions can be prevented, and this is detrimental to many applications such as, for example, those relating to road safety in inter-city or urban areas when it is imperative to make accurate transmission of at least one message during determined periods of time that are relatively short (for example 100 ms) to other mobile bodies or vehicles within effective range.

SUMMARY OF THE INVENTION

The aim of the invention is to overcome the above-mentioned drawbacks.

To this effect, an aim of the invention is a method for the transmission of data among mobile bodies or autonomous vehicles communicating with one another by radio link on a single radio channel with a limited range of transmission and a determined recurrence of transmission T comprising the steps of:

constructing, in each transmitter/receiver of the mobile body or vehicle, information tables recording the changes undergone by the radio channel by the memorizing, during consecutive time intervals of a determined duration dT that are smaller than the period of recurrence T, of the statuses of the radio channel, namely "in collision", "busy" or "free", setting fixed transmission instants in each transmitter/receiver, these fixed transmission instants being temporally spaced out at intervals equal to the recurrence period T, predicting the status of the channel for each fixed transmission instant as a function of the status of the channel memorized at the instant preceding it with a temporal shift equal to the period T, and deciding to transmit at this instant if the predicted status of the channel is not a status of collision or to transmit at an instant deferred with respect to the predicted instant if the opposite is the case.

The chief advantage of the method according to the invention is that it enables groups of mobile bodies or vehicles linked to one other or within radioelectric range of one another, without having any a priori knowledge of their number or any indication of the status and changes undergone by the links and without having any common time reference, to transmit and receive messages in very greatly minimizing the risks of the collision of transmissions.

DESCRIPTION OF THE DRAWINGS

Other features and advantages of the invention shall appear here below from the following description, made with reference to the appended drawings, of which:

FIG. 8 is a timing diagram illustrating a transmission postponement method carried out by a mobile body;

FIG. 9 is a timing diagram used to illustrate a mode of detecting collision between two mobile bodies.

DESCRIPTION OF THE INVENTION

The method according to the invention described hereinafter can be applied especially to cases where all that the mobile bodies or vehicles have as sources of information to communicate with one another by radio link is the status of their local radioelectric channel, the quality of the message that their receive from the other mobile bodies or vehicles and their temporal reference which depends, for each transmitter/receiver of a mobile body or vehicle, on the precision of their master oscillator.

Quite naturally, the method can also be applied to the case where vehicles or mobile bodies move about in an environment of radioelectric beacons positioned on their path, each beacon being fitted out with the same communications means as those with which the mobile bodies or vehicles are fitted out. A beacon, from this viewpoint, is considered to be a mobile body or vehicle that is at a stop.

According to the invention, the status of the radio-electric channel is analyzed in considering only three statuses, a "free" status during which no transmission is picked up by the mobile body or vehicle, a "busy" status in which the mobile body or vehicle may demodulate a transmission or an "in collision" status in which the mobile body or vehicle detects radioelectric power on the channel without being able to decipher any coherent information. The exchange of data among mobile bodies or vehicles is organized so that whenever a mobile body or vehicle tries to send a message, it does so recurrently according to a period T every 100 ms for example, in sending a certain number of status indicator bits within this message, indicating the local status of the radio channel.

Before transmission, the mobile body or vehicle should determine the general status of the radio channel through the status indicator bits contained in the messages that it has already received.

If, at this instant, the channel is seen as being "free" or "busy", the mobile body or vehicle transmits.

If, on the contrary, the mobile body or vehicle is seen as being in collision, the mobile body postpones its transmission randomly to a following instant recognized as being "free".

After a transitory phase, each mobile body or vehicle can thus determine an instant of transmission without collision, and can thus transmit periodically and without collision at the frequency 1/T.

Figure 1:
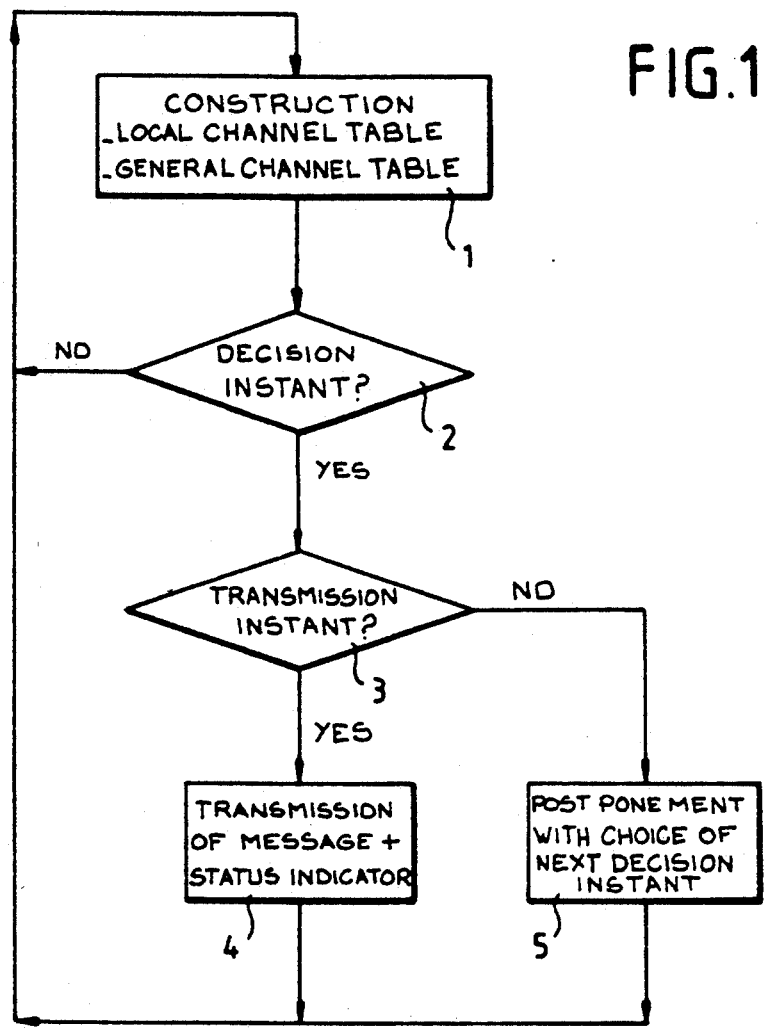
FIG. 1 is a flow chart illustrating a method of access to a transmission channel according to the invention.

The access procedure shown in FIG. 1 has five processing steps. A first step referenced 1 in FIG. 1 consists in constructing the tables that represent the changes in the status of the radio channel, obtained either locally by listening to it or on a general basis, with a delay equal to a period T of recurrence of the transmissions, using status indicator bits contained in the messages received. The step 1 lasts until the arrival at the step 2 of a transmission decision instant determined during the preceding transmission. The third step 3 consists in deciding the transmission instant on the basis of the information elements contained in the table of the overall changing of the channel, constructed in the step 1. The fourth step 4 consists in carrying out the transmission of the useful message and of the status indicator bits representing the local changing of the channel, and in fixing the next transmission instant after the passage of a later period of time T. Finally, the step 5 consists in postponing the transmission with a computation of a following instant of transmission decision and with an updating of the previous tables if no decision to transmit has been taken at the step 3.

As already specified in the description of the step 1, each mobile body constructs two different tables relating to the status of the channel, seen during a period T of recurrence, namely one table representing the instantaneous local status and one table representing the general status at an instant preceding the instant of transmission by a period of recurrence T.

The construction of the local status table is done in taking account of the recurrence T of the transmissions and of the duration dT of the messages. The status of the channel is determined by duration steps equal to 1 ms for example. At each transmission, the vehicle transmits, in addition to the useful message, T/dT information elements representing the status of the channel analyzed according to the three statuses "FREE", "BUSY" or "IN COLLISION".

Thus, during each elementary bracket of time dT, the mobile body scrutinizes the radio channel and, since the different mobile bodies are not synchronized, during each elementary instant dT, the radio channel can change several times from one to another of the three preceding statuses. Under these conditions, the status of the channel during the period dT may be determined by complying, for example, with the following choices:

if the channel has been seen at an instant of collision, the entire interval dT is considered to be "in collision";

if the channel has been seen at a "busy" instant, without collision on the time interval dT, then the entire interval is considered to be "BUSY";

and the interval dT may be considered to be "FREE"
  if there has been neither collision nor any message transmitted during this interval,
  or possibly another choice by the weighting of the statuses of the channel and comparison with one or more pre-determined thresholds.

Since each mobile body cannot scrutinize the status of the channel during the period, also equal to dT, in which it is transmitting, this time interval is not transmitted in the status indicator information elements.

Figure 2:
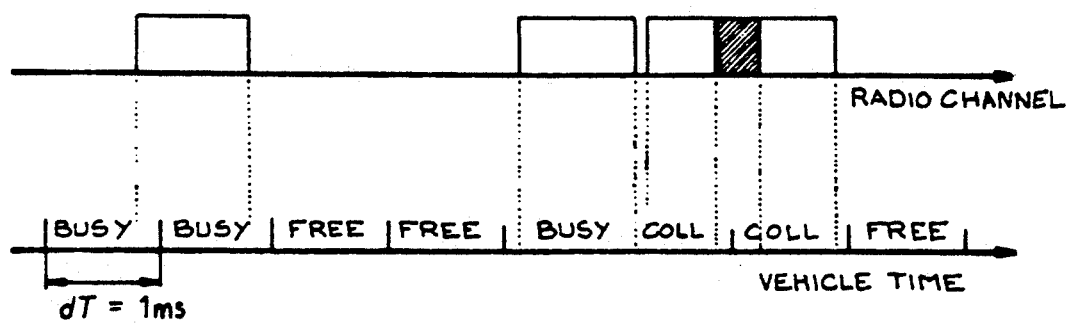
FIG. 2 is a timing diagram to illustrate the principle, according to the invention, of the determining of the local status of a transmission channel.

Thus, should T=100 ms and dT=1 ms, it is enough to send 99 information elements encoded in three statuses, that is $157=(\log_2(3^{99}))$. This mechanism is represented in FIG. 2.

The general status table is constructed from the local status tables transmitted by the other mobile bodies or vehicles in their messages.

Figure 3:
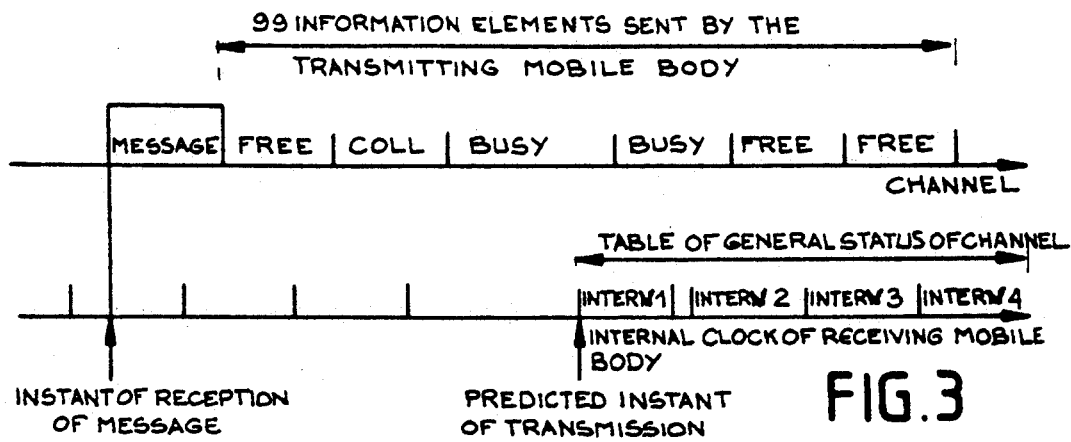
FIGS. 3 and 4 are timing diagrams to illustrate the process of creation of tables on the general status of the channel.

The receiving mobile body creates the general status table by intervals dT (like the local status table), in starting it with its next predicted transmission instant as shown in FIG. 3.

The three possible statuses of the channel, "FREE", "BUSY" and "IN COLLISION" are assigned a numerical weight, for example 0, 1 and 2.

Figure 4:
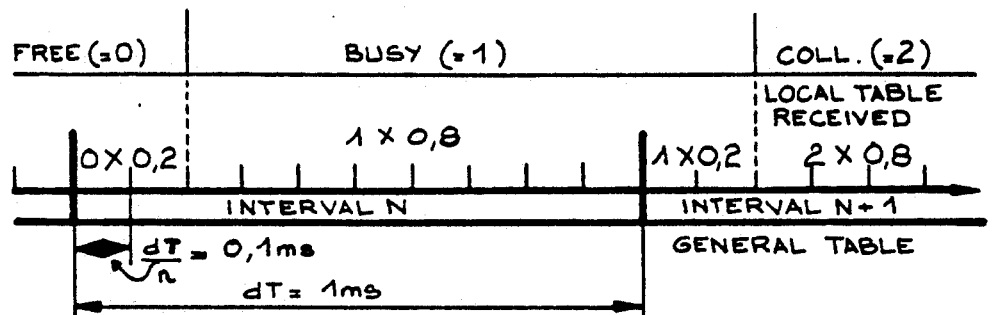

The assignment of a numerical value for each interval dT of the general status table of the receiving mobile body is done by multiplying the weight of the status of the channel on an interval dT of the local table of the transmitting mobile body by its part that is common with this interval in the general table of the receiving mobile body, in the manner shown in FIG. 4.

In FIG. 4, the interval N with a duration dT is assigned the value $0.8=(0\times0.2+1\times0.8)$ and the interval N+1 is assigned the value $1.8=(1\times0.2+2\times0.8)$.

For each message received, the same assignment is done and the mean value of each, interval of the general status table is computed in taking account of the number of assignments.

The status of the channel for each interval dT is determined by comparing the mean value of each interval with two thresholds, S1 and S2.

if the mean value is greater than S1, the interval is considered to be "IN COLLISION";

if the mean value is between S1 and S2, the interval is considered to be "BUSY";

if the mean value is smaller than S2, the interval is considered to be "FREE".

The values of S1 and S2 have to be determined experimentally, and they may typically be fixed so that $S_1=1.3$ m and $S_2=0.3$ m. in taking up the above numerical example.

The table of the general status of the channel thus represents, for each of its intervals, the status of the channel in the perimeter of the effective range of the closest neighbors of the receiving mobile body at the preceding period of time T.

The transmission decision phase of the step 2 starts at the transmission decision instant determined during the preceding recurrence.

It starts with the analysis of the interval of the general status table of the channel corresponding to the predicted transmission instant.

If the interval is "FREE" or "BUSY", the transmission takes place normally at the predicted instant. The procedure then continues with the transmission phase of the step 4.

If the interval is "IN COLLISION", it means that there is a conflict of access on this time interval. The transmission then does not take place, and the procedure continues with the transmission postponing phase of step 5, with the determining of a new instant of decision and transmission.

To prepare the transmission phase, the mobile body constructs, for example, the message to be transmitted by interlacing the data bits and the status indicator bits.

The next transmission instant is then fixed at a later period of time T.

The mobile body sends its message, which lasts dT, and the procedure returns to the channel listening and table construction phase of step 1 phase.

Figure 5:
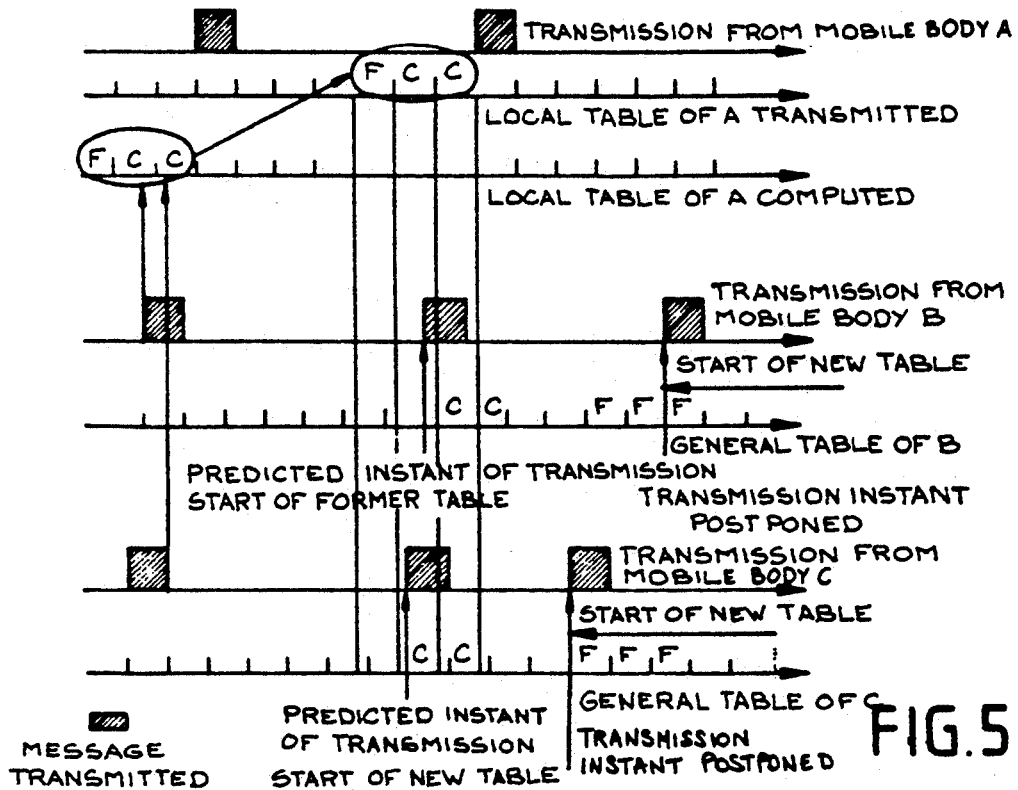
FIG. 5 is a timing diagram illustrating a process of transmission carried out by three mobile bodies.

The transmission postponement phase of step 5 takes place when there has been collision on the radio channel during the previous transmission of the mobile body. As shown in FIG. 5, the mobile body analyzes the general status table during the step 5, memorizes the time intervals dT that are free during the last recurrence interval and makes a random choice therefrom of that instant which should correspond to the next transmission instant T.

The random determining of the duration of the postponement enables a considerable reduction in the risks of collision between the same mobile bodies during a following transmission.

Once the transmission instant has been determined, the mobile body re-updates its general status table in shifting it temporally so as to make it start at the new transmission instant determined previously.

The top three lines of FIG. 5 illustrate transmission information pertaining to mobile body A. The dark portions of the top line illustrate transmissions from mobile body A. The third line in FIG. 5 illustrates the status of the channel as determined by mobile body A. The first three entries of the third line of FIG. 5 are F C C. The F means the channel is free of transmissions and the Cs indicate the channel is in a collision state because there are simultaneous transmissions from mobile body B and mobile body C. The second line of FIG. 5 illustrates the status of the channel which was transmitted by mobile body A. Note that there is a delay from the time that the status of the channel is computed until the status of the channel is transmitted to the mobile bodies in the system.

The local table transmitted by A is transmitted on the channel to any mobile body within range of mobile body A. In the present example, mobile body B and mobile body C detect the local table transmitted by mobile body A.

Each mobile body computes a local table as illustrated for mobile body A in FIG. 5. For simplicity's sake, the local tables computed by mobile bodies B and C are not illustrated.

Mobile bodies B and C receive the transmitted local table of mobile body A and determine that they are transmitting at the same time a collision is occurring on the channel. This is determined by calculating a general table in each of the mobile bodies B and C using the local tables transmitted by the other mobile bodies. Note that each mobile body calculates a general table. However, for simplicity's sake, the general table of mobile body A has not been illustrated.

In FIG. 5, each of mobile bodies B and C determine, from their constructed general table, that they are transmitting when a collision is occurring on the channel. Consequently, each of mobile bodies B and C do not transmit again at the same time but transmit during a randomly selected one of a free timed period marked F in FIG. 5.

The procedure then returns to the channel listening and table computation phase of the step 1.

After a transitory phase, each mobile body has determined a transmission instant without collision and can thus transmit periodically at the recurrence period T.

The foregoing procedure cannot be used, however, to resolve the particular situation in which there are only two mobile bodies or vehicles linked to each other, with their transmission synchronized to the nearest dT. In this case, their messages would be in collision. With no external mobile body to inform them of their collision, the two mobile bodies are unaware of each other and cannot modify their transmission instants.

An operation of listening for the free status of a channel before transmission may enable this problem to be resolved until a synchronization of duration $t_r$, said duration being equal to the reaction time of the receivers, between the two mobile bodies.

For, in taking up the previous numerical example, and in fixing, for example, the transmission bit rate envisaged at 1Mbit/s, a standard receiver would need about 100 bits to get synchronized with a coherent transmission giving, in this case, a period $t_r=100$ μs. Hence, a channel listening operation of less than 100 μs cannot enable the detection of the start of a transmission from a mobile body in this interval and a complementary procedure thus proves to be necessary for this procedure may in fact consist of an initialization phase when the network is created or when it extends for the first time between two vehicles.

Three approaches also appear to be possible to resolve this problem. One consists of a particular initialization. Another consists of a temporal shifting of the transmission instant. In the third approach, the message is divided, at transmisstion, into two parts separated by a listening phase with a duration $t_r$.

Figures 6, 7:
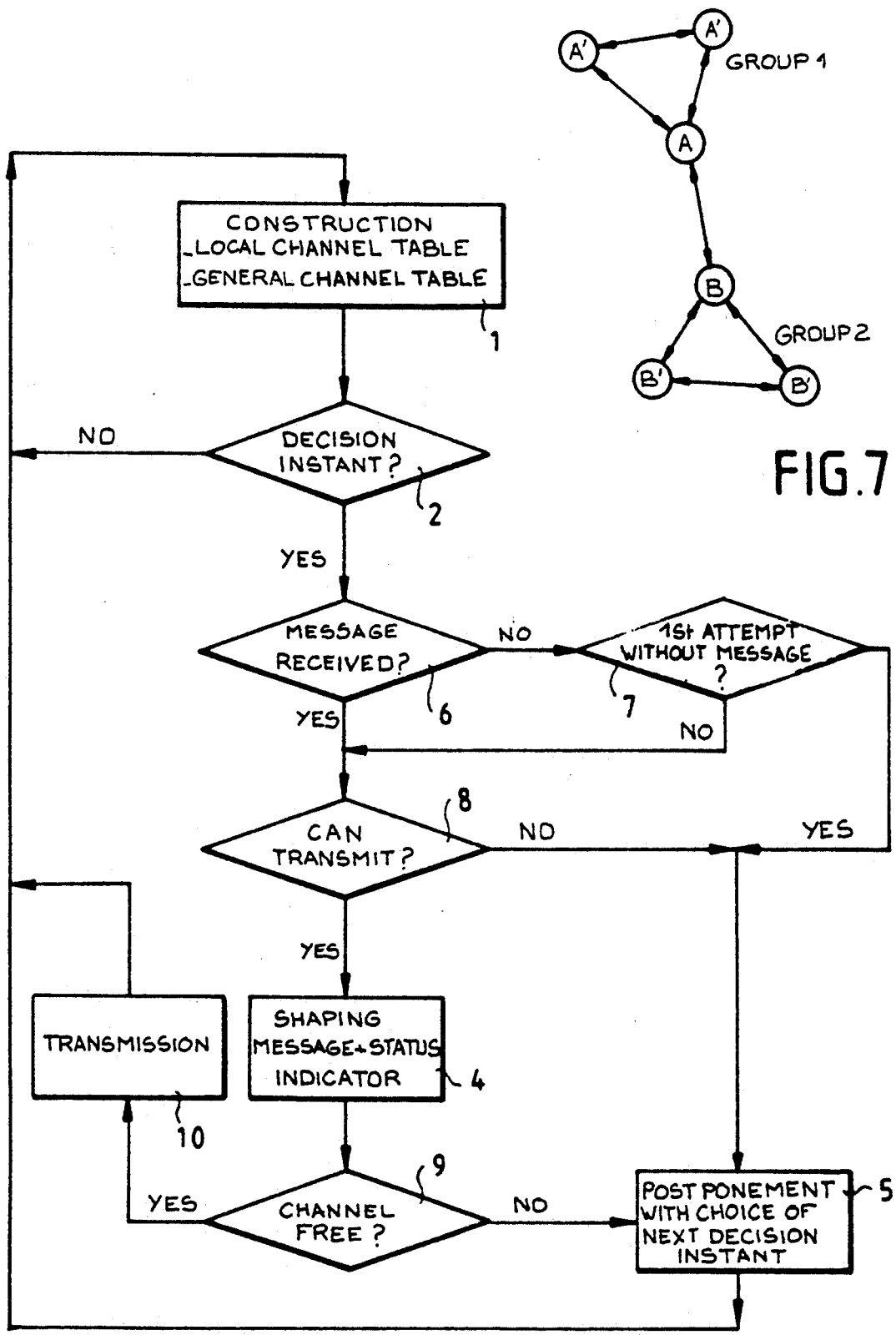
FIG. 6 is a flow chart to illustrate a mode of operation in transmission of two modules, without there being any collision between transmissions.
FIG. 7 is a diagram illustrating a configuration of operation between two different groups of mobile bodies.

The approach using the initialization phase shown in steps 1 to 10 of FIG. 6 (in which the steps homologous to those of FIG. 1 are shown with the same references) may for example be adopted when the mobile body has received no message during the 100 ms following its last transmission. Since no message has been received, the predicted transmission interval is necessarily free but the mobile body or vehicle must all the same postpone its transmission by a period having a random duration which is a multiple of 1 ms and smaller than a recurrence (100 ms). The mobile body or vehicle may then reposition itself in the channel listening phase.

When the second transmission attempt comes, the mobile body transmits indicating that it has received or not received a message since its last attempted transmission. It therefore goes into the transmission decision phase and follows the normal cycle of the procedure to then return to the initialization phase if it has received no message during the following recurrence.

With the postponement, the mobile body or vehicle then transmits one message per 100 ms, this is not troublesome since it means that there is no mobile body or vehicle to listen to it.

The second approach, which consists in temporally shifting the transmission instant, is used when the above explained approach, which is efficient in the case of isolated mobile bodies, is no longer appropriate when, for example, two isolated groups of mobile bodies get linked, as shown in FIG. 7, by means of two synchronized mobile bodies, each belonging to one of the two groups. In this case, the total network is stabilized but the two mobile bodies are unaware of each other and even do not detect each other since their transmissions always take place simultaneously.

In the example of FIG. 7, the group 1 and the group 2 get linked by the mobiles A and B. If A and B have their tranmissions synchronized, the linking up of the two groups will in no way disturb the relationship of recurrence determined for each of the two groups, but A and B can never exchange messages.

To prevent this, and to inform the two groups that there has been a modification of the link, A and B should themselves perceive that their transmissions are in collision since no external mobile body can indicated this to them. The approach used to overcome this drawback is to make each mobile body transmit at the transmission instant predicted for it by the rest of the procedure but with a determined time shift of $+/-t_r=0.1$ ms, which is chosen for example randomly at each transmission. Thus, irrespectively of the state of the synchronized mobile bodies (isolated or in a network), it is alway possible for them, after a few recurrences, to detect the fact that their messages are in collision.

When one of the mobile bodies has recognized a collision, it temporally shifts its transmission according to the transmission procedure described in the above paragraphs.

Finally, rather than shifting the instant of transmission by $\pm t_r$, the third approach consists, as shown in FIG. 9, in broadcasting the message in two parts separated by a duration $t_r$ on the slot with a duration $dT$ allotted to each vehicle or mobile body for its transmission so that, between the two parts with a total duration $dT-t_r$, the interval $t_r$ is available in reception and can be used by the mobile body or vehicle to detect the presence, if any, of another transmission and hence the fact of a collision. Consequently, if the mobile body or vehicle receives a message on the slot $t_r$, it can thus stop its transmission and go into the transmission postponement procedure. The instant of truncation in the interval $dT$ is determined randomly with respect to the start of the transmission. This random duration may, for example, range from 0.2 ms to 0.8 ms in taking for example the values 1 ms and 0.1 ms respectively for $dT$ and $t_r$. The fact that the instant of truncation is random enables the two synchronized mobile bodies statistically to perceive each other by their mutual presence at the end of some recurrences, if no other external vehicle is able to inform them of this beforehand.

What is claimed is:

1. A method for the transmission of data among mobile bodies or autonomous vehicles communicating with one another by radio link on a single radio channel with a limited range of transmission and a recurrence period, T, of transmission, comprising the steps of:

constructing, in a transmitter/receiver of each of the mobile bodies or vehicles, information tables recording changes undergone by the radio channel by memorizing, during consecutive time intervals I of a determined duration $dT$ that are smaller than the recurrence period T, of statuses of the radio channel, selected from a group of the statuses including "in collision", "busy" and "free";

setting fixed transmission instants in each of said transmitter/receivers, said fixed transmission instants being temporarily spaced out at intervals equal to the recurrence period T;

predicting the status of the channel for each of said fixed transmission instants as a function of the status of the channel memorized at an instant preceding said each of said fixed transmission instants with a temporal shift equal to the recurrence period T; and deciding to transmit at one of said fixed transmission instants if the predicted status of the channel is not a status of collision or to transmit at an instant deferred with respect to said one of said fixed transmission instants if the predicted status of the channel is busy or free.

2. A method according to claim 1, wherein the information tables of the mobile bodies or vehicles include a first table for memorizing a local status of the channel determined by locally monitoring the status of the channel and a second table for memorizing a general status of the channel determined using local statuses of the channel determined by others of the mobile bodies or vehicles.

3. A method according to claim 2, wherein the general status of the channel, over the time intervals I, is determined by assigning, to each of the time intervals I, a numerical value computed from a weighted mean of said each of the time intervals I;

the weighted mean of said each of the time intervals I is determined by breaking up said each of the time intervals I into n components, assigning a coefficient corresponding to the statuses, "free", "busy" or "in collision" to each of the n components, and averaging the assigned coefficients over said each of the time intervals I, and the numerical values are determined by comparing said weighted mean of said each of the time intervals I with two values of predetermined thresholds $S_1$ and $S_2$.

4. A method according to claim 3, wherein:

one of the time intervals I is considered to be "in collision" if the weighted mean of said one of the time intervals I is greater than the first threshold $S_1$;

said one of the time intervals I is considered to be "busy" if the weighted mean of said one of the time intervals I is between the first threshold $S_1$ and the second threshold $S_2$; and said one of the time intervals I is considered to be "free" if the weighted mean of said one of the time intervals I is smaller than the second threshold $S_2$.

5. A method according to claim 4, further comprising the steps performed, when there is a collision:

memorizing the time intervals I considered to be "free" during a preceding recurrence period T, and making a random choice of a next instant of transmission in a current recurrence period T from among homologous time intervals I considered to be "free" in the preceding time interval.

* * * * *